United States Patent Office  2,985,373
Patented May 23, 1961

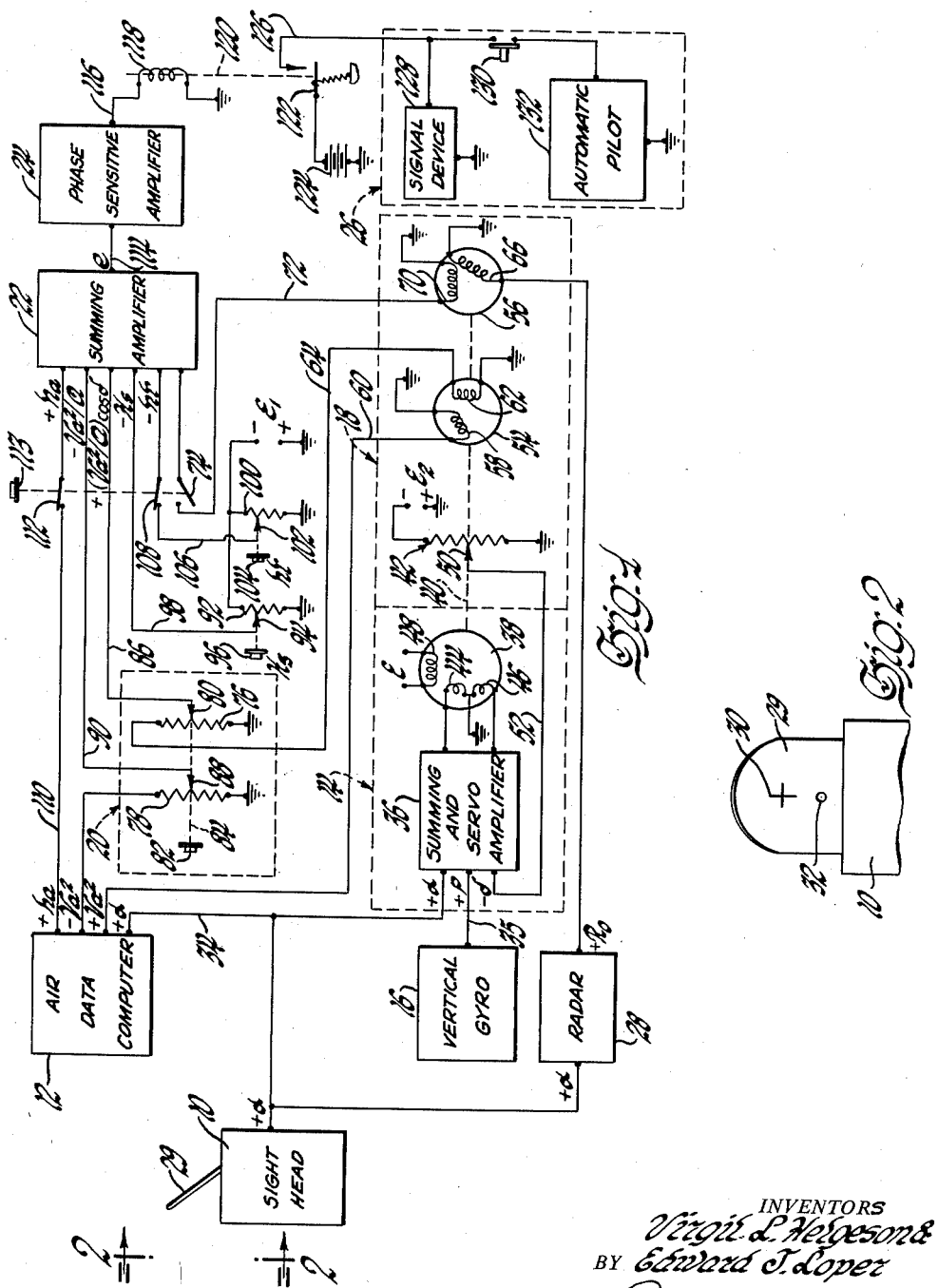

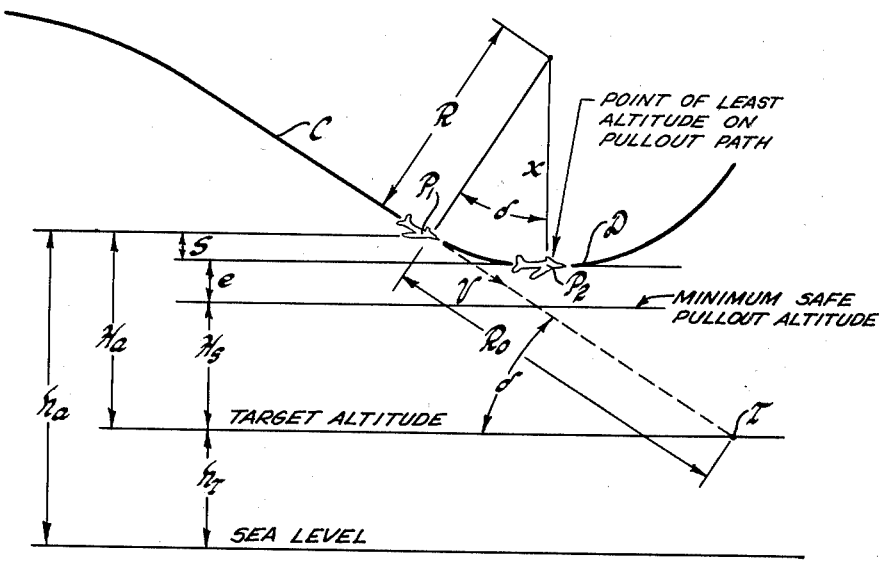
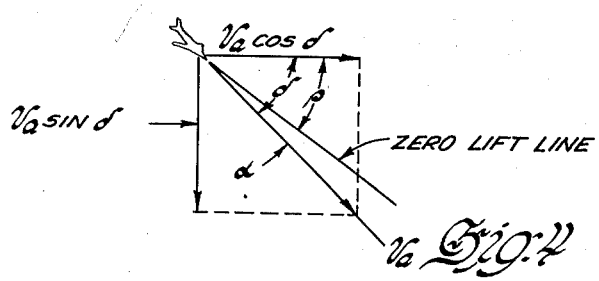
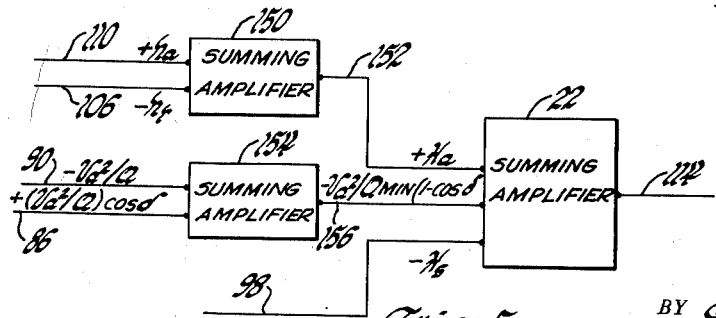

2,985,373

OBSTACLE CLEARANCE COMPUTER SYSTEM FOR AIRCRAFT

Virgil L. Helgeson and Edward J. Loper, Milwaukee, Wis., assignors to General Motors Corporation, Detroit, Mich., a corporation of Delaware Filed July 16, 1956, Ser. No. 598,048

6 Claims. (Cl. 235—186)

This invention relates to computers for aircraft and more particularly to an obstacle clearance computer for predicting the geometry of a flight path to enable timely initiation of a corrective maneuver.

In modern high speed aircraft, particularly military craft, considerable space is required for the execution of turns, pull-up maneuvers and the like and consequently continuous estimates must be made to ensure appropriate restriction of the flight path or clearance of obstacles. For example, in dive approach bombing a loss of altitude is necessarily incurred following the initiation of the pull-up maneuver. The amount of the loss of altitude is dependent on numerous variable factors and accurate estimation of the clear space required is very difficult.

Aircraft toss bombing computer systems have ben devised which provide a successful solution to the bombing problem without imposing restrictions upon the bombing run such as the approach to the target, the bomb release angle, or the pull-up acceleration of the aircraft. Such toss bombing systems may be operated in the dive mode in which the pilot tracks the target with an appropriate sight during a dive approach in which the aircraft is flown initially along a collision course or a straight-line path containing the target, and an automatic bomb release is effected by the system when any satisfactory solution to the bombing problem is attained. The solution is obtained, usually during a pull-up maneuver, at a point in the flight path which is tangent to a bomb trajectory intersecting the selected target. A toss bombing computer system of this type is disclosed and claimed in the copending U.S. application Serial No. 598,034, filed on even date herewith for Bombing Navigational Computer by Virgil L. Helgeson and Edward J. Loper and assigned to the assignee of the present invention.

In dive approach bombing the pull-up maneuver should be initiated as late as possible on the collision course so that the bomb will be delivered to the target with maximum velocity at minimum range. In order to avoid a premature pull-up maneuver, it is desirable to provide a signal to the aircraft pilot when the pull-up maneuver must be initiated to avoid transgressing a minimum safe altitude. The provision of such a signal insures maximum effectivenes in bomb delivery and relieves the pilot of the burden of estimating the appropriate time for initiation of the corrective maneuver.

Accordingly, it is an object of this invention to provide an aircraft computer system which will signify the latest time at which a corrective maneuver may be initiated to provide clearance of an established limit.

Another object of this invention is to provide a computer system for aircraft which is operative to predict the loss of altitude to be incurred in a given pull-up maneuver.

An additional object of this invention is to provide a terrain clearance warning system for aircraft which affords bomb delivery to a given target with maximum velocity and at minimum range.

A further object of the invention is to provide a combined toss bombing computer system and terrain clearance warning system for aircraft.

In accordance with this invention, the impending loss of altitude in a given pull-up maneuver of the aircraft is computed continuously throughout a given flight course, bombing run, or the like. This is accomplished by developing a signal quantity corresponding to the pull-up radius of curvature at the existing aircraft velocity and a given minimum value of acceleration. An additional signal quantity is developed which corresponds to the vertical component of the distance of the aircraft from the center of curvature at the existing dive angle of the aircraft. The difference of these signal quantities corresponds to the impending loss of altitude and is continuously compared with the instantaneous height of the aircraft above the minimum safe altitude. When the compared values become equal, a command signal is developed which calls for the initiation of the pull-up maneuver.

A more complete understanding of the invention may be had from the detailed description which follows, taken with the accompanying drawings in which:

Figure 1 is a schematic illustration of the inventive computer system.

Figure 2 is a view taken on line 2—2 of Figure 1.

Figure 3 is a graphical representation of the geometry of the obstacle clearance problem.

Figure 4 is a graphical representation of the geometry involved in deriving the dive angle.

Figure 5 is a modification of a portion of the system illustrated in Figure 1.

Referring now to the drawings, there is shown an illustrative embodiment of the invention particularly well suited for use in military aircraft in conjunction with a toss bombing computer. Before presenting the description of the system instrumentation, it will be helpful to consider the geometry and formulation of the clearance problem.

Figure 3 illustrates the geometry of a typical obstacle clearance problem encountered in the dive mode of toss bombing. The selected target T is known to be located at an elevation $h_T$ above a selected datum plane such as sea level. Due to the type of terrain surrounding the target, weather conditions, tactical restrictions or other factors, it is determined that the minimum safe distance above the target is elevation $H_s$. The selected dive approach course of the aircraft is prepresented by the line C. At any point P on the dive approach path the aircraft is at an altitude $h_a$ above sea level and at an altitude $H_a$ above the target. At point $P_1$ the aircraft, moving with a velocity V, is caused to initiate a pull-up maneuver. The pull-up course D for constant acceleration and velocity is approximately circular and the loss of altitude S is the difference in elevation of the point $P_1$ and the lowest point $P_2$ of the pull-up path. The point $P_2$ is at an elevation $e$ above the minimum safe altitude $H_s$. Formulation of the obstacle clearance problem may be derived conveniently by inspection of the geometry of Figure 3 as follows:

$$H_a - H_s - S = e \qquad (1)$$

When the quantity $e$ becomes zero, the impending loss of altitude S is just equal to the difference between present aircraft altitude and minimum safe altitude. In this condition the pull-up maneuver must be initiated to ensure safe clearance from the obstacles or limits in the course of the aircraft. This condition is defined by $$H_a - H_s - S = 0 \qquad (2)$$

In order to facilitate instrumentation of the general clearance Equation 1, it is desirable to express the quantities in terms of readily available data. The quantity $H_a$ may be measured, directly or indirectly, and the quantity $H_s$ is introduced as a known value. The quantity S however does not exist as a physical reality at the time when the general clearance Equation 1 must be evaluated. The value of S must be, therefore, a predicted value based on existing data.

The predicted value of the impending loss of altitude, S, may be derived from the following considerations. At any time in the dive approach the maximum radius of curvature of the pull-up path is $$R = \frac{V_a^2}{A} \quad (3)$$

where $R$ = radius of curvature of pull-up path.
$V_a$ = true airspeed of the aircraft.
$A$ = minimum value of acceleration to be incurred in the pull-up maneuver.

The velocity $V_a$ is a vector quantity having a direction which is angularly displaced from the horizontal plane by the dive angle, $\delta$. The value of the dive angle is readily derived as indicated in Figure 4 from the relation $$\delta = p + \alpha \quad (4)$$

where
$p$ = the pitch angle of the aircraft.
$\alpha$ = the angle of attack of the aircraft.

The radius line of the pull-up path which extends through the point $P_1$ is angularly displaced from the vertical by the dive angle $\delta$ and therefore the vertical component, X, of the radius line through the point $P_1$ may be expressed as $$X = R \cos \delta \quad (5)$$

It is now apparent that the loss of altitude is $$S = R - X \quad (6)$$

Substituting Equations 3 and 5 into Equation 6 yields $$S = \frac{V_a^2}{A}(1 - \cos \delta) \quad (7)$$

The general clearance Equation 1 may be expressed in the terms of Equation 7 as follows:

$$H_a - H_s - \frac{V_a^2}{A}(1 - \cos \delta) = e \quad (8)$$

As described previously the pull-up maneuver must be initiated when the summation of the left hand side of the equation is zero, or when $$e = 0 \quad (9)$$

Accordingly, the conditions for development of the obstacle clearance signal are defined by the pull-up equation:

$$H_a - H_s - \frac{V_a^2}{A}(1 - \cos \delta) = 0 \quad (10)$$

where
$H_a$ = elevation of aircraft above the target.
$H_s$ = minimum safe elevation of aircraft above the target.
$V_a$ = true airspeed of aircraft.
$A$ = the minimum value of acceleration which will be incurred in the pull-up maneuver.
$\delta$ = the dive angle of the aircraft.

The pull-up Equation 10 may be instrumented readily to provide automatic computation. The value of acceleration in the pull-out maneuver is established in accordance with the minimum value which will obtain in the pull-up maneuver to ensure that the point of least altitude $P_2$ will not be below the minimum safe altitude S. Of course, if the acceleration A exceeds the minimum expected value, the radius of curvature in the pull-up path will be smaller and will afford a margin of clearance from the minimum safe pull-out altitude S.

The computer system for instrumenting the pull-up Equation 10 to provide a command signal in response to a solution of the equation is illustrated in Figure 1. The computer system components for developing and modifying data signal voltages which represent the system parameters are generally conventional and well known in the art. Accordingly, the system is illustrated in schematic single line fashion for the sake of clarity in emphasizing the invention. The signal voltages and exciting voltages, unless specified otherwise, are alternating voltages. The relative phase of the voltages is designated by the convention of plus and minus symbols in which those voltages with like symbols are of the same phase and those with unlike symbols are opposite in phase.

In general, the system comprises a sighthead 10 for facilitating target tracking by the pilot and an air data computer 12 for deriving data signals for the computer system. A dive angle servo designated generally at 14 receives input signals from the air data computer 12 and from a vertical reference 16, and is operatively connected with a dive angle function generator 18. The output of the function generator 18 is supplied to a division network 20. The division network 20 receives signals from the air data computer and from the dive angle function generator and supplies input signals to the summing circuit 22. A phase sensitive amplifier 24 responds to a null summation of the signals in the summing amplifier 22 and provides an output voltage which is applied to the utilization apparatus designated generally at 26. Radar equipment 28 may be provided for use in conjunction with the dive angle function generator 18 for deriving altitude information.

The sighthead 10 is of any suitable type, such as the well known model A-4 sighthead, adapted to facilitate accurate tracking of a selected target by the pilot of the aircraft. It is desirably of the type which includes a combining glass 29 upon which is projected a fixed reticle 30 and a movable pipper 32. The movable pipper 32, having a reference position corresponding to the zero lift line of the aircraft, is adjustable positioned in elevation by a servo driven optical projection system in accordance with the attack angle of the aircraft. The position of the pipper then corresponds to the velocity vector of the aircraft. Therefore, the pilot achieves accurate tracking of the target by adjusting the attitude of the craft so that the movable pipper 32 is centered on the target.

The air data computer 12 is a converter system responsive to selected air pressure for developing electrical signals corresponding to certain parameters of the aircraft position and motion. The air data computer may be of the type currently available from Servomechanisms, Inc., identified as model No. AXC-129. The air data computer develops a signal voltage proportional in amplitude and corresponding in phase to the magnitude and sense of the attack angle of the aircraft. The attack angle signal voltage is supplied by conductor 34 to the dive angle servo 14. The air data computer 12 also develops signal voltages proportional in amplitude to the square of the true air speed $V_a$. These signal voltages are provided in the form $+V_a^2$ and $-V_a^2$. An additional signal voltage from the air data computer is the absolute altitude $h_a$, the elevation of the aircraft above sea level.

A vertical reference 16, suitably a conventional vertical gyroscope pick-off, develops a signal voltage proportional to the pitch angle $p$ of the aircraft. The pitch angle signal voltage $p$ is supplied by conductor 35 to the dive angle servo 14.

The dive angle servo 14 is a closed loop servomechanism which responds to the algebraic sum of the pitch and attack angle voltages to angularly position an output shaft in accordance with the instantaneous value of dive angle of the aircraft. The dive angle servo 14 comprises a summing and servo amplifier 36 which is adapted for energization of the reversible servo motor 38 having an output shaft 40 connected with the follow-up signal generator designated generally at 42. The input to the summing and servo amplifier includes the attack angle signal voltage α, the pitch signal voltage p, and the follow-up dive angle signal voltage δ. The amplifier 36 is effective to combine the input signal voltages and to provide an output voltage proportional in amplitude and corresponding in phase to the algebraic sum of the input signals. The output of the amplifier 36 is applied to the reversible phase windings 44 and 46 of the servo motor 38. A reference phase energizing winding 48 is provided in the servo motor 38 and is connected with a suitable source of alternating supply voltage E. The output shaft 40 of the servo motor 38 is drivingly connected with the movable contact 50 of the follow-up pick-off or potentiometer 42. The potentiometer 42 is excited with an alternating voltage $E_2$ and the follow-up signal voltage derived from the potentiometer 42 is fed back through conductor 52 to the input of the summing and servo amplifier as the dive angle input signal. As a result, the output shaft 40 of the dive angle servo 14 assumes a rotative position at all times which is representative of the dive angle of the aircraft. This mechanical output of the dive angle servo is transmitted by the output shaft 40 to the dive angle function generator 18.

The dive angle function generator 18 comprises a velocity signal resolver 54 for developing a signal voltage proportional to the product of the square of the true air speed and the cosine of the dive angle. It also includes a range signal resolver 56 for developing an output signal voltage proportional to the horizontal range from the aircraft to the target. The resolvers 54 and 56 are suitably coupled with the output shaft 40 of the dive angle servo 14 for positioning of the rotors in correspondence with the instantaneous dive angle of the aircraft. In the resolver 54 the rotor winding 58 is excited through conductor 60 with the signal voltage $V_a^2$ corresponding to the square of the true air speed of the aircraft. The stator winding 62 of the resolver 54 is inductively coupled to the rotor winding 58 and develops an output voltage which is a cosine function of the shaft position of the resolver. This output voltage is applied through conductor 64 to the division network 20. The resolver 56 has its rotor winding 66 excited with the signal voltage $R_o$ which is developed by radar 28 and is proportional to the slant range between the target and the aircraft. The fixed or stator winding 70 of the resolver 56 develops a signal voltage output which is a sine function of the rotor position and is applied through conductor 72 and switch contacts 74 to the summing amplifier 22.

The division network 20 includes a potentiometer 76 for developing an output signal voltage proportional to the vertical component of the radius of curvature of the flight path corresponding to a given dive angle and a potentiometer 78 for developing a signal voltage proportional to the radius of curvature of the flight path corresponding to a given dive angle. The potentiometer 76 is excited with the output voltage of the resolver 54 through the conductor 64. The movable contact 80 is positioned by a manually adjustable control device 82 through the shaft 84 in accordance with the reciprocal of the minimum value of acceleration A which the pilot intends to pull in the pull-up maneuver. The output signal voltage of the potentiometer 76 is supplied through conductor 86 to the summing amplifier 22.

The potentiometer 78 is excited with a signal voltage $-V_a^2$ corresponding to the square of the aircraft velocity and which is derived directly from the air data computer 12. The movable contact 88 of the potentiometer 78 is also positioned by the manually adjustable device 82 and shaft 84. The position of the movable contact 88 is therefore proportional to the reciprocal of the minimum value of acceleration which the pilot intends to pull in the pull-up maneuver. The output signal voltage from the potentiometer 78 is supplied through the conductor 90 to the summing amplifier 22.

A signal voltage proportional to the minimum safe pull-out altitude $H_s$ is developed by a potentiometer network 92 which is excited from a reference voltage source $E_1$. The potentiometer 92 includes a movable contact 94 which is manually adjustable by a control device 96 which is set in a position corresponding to the predetermined value of the minimum safe pull-out altitude. The signal voltage corresponding to this value of altitude is applied through conductor 98 to the summing amplifier 22.

A signal voltage proportional to the elevation of the target above sea level $h_t$ is developed by the potentiometer 100 which is also excited from the reference voltage source $E_1$. The potentiometer 100 includes a movable contact 102 which is manually adjustable by a control device 104 to a position corresponding to the target altitude. The signal voltage $h_t$ is developed on the movable contact 102 and applied through conductor 106 and switch contacts 108 to the summing amplifier 22. A signal voltage proportional to the altitude of the aircraft above sea level $h_a$ is derived directly from the air data computer 12 and applied through conductor 110 and switch contacts 112 to the summing amplifier 22. The contacts 108, 112, and 74 are actuable by a switch 113.

The summing amplifier 22, of conventional design, develops an output signal voltage e which is proportional to the algebraic sum of the input signal voltages and which is applied through conductor 114 to the phase sensitive amplifier 24. The phase sensitive amplifier, also of conventional design, is adapted to respond to an input signal voltage of null or zero value and an input signal voltage of predetermined phase to develop an output voltage on conductor 116. A relay 118 is connected in the output circuit of the phase sensitive amplifier 24 and is energized upon the occurrence of a null input signal voltage. The relay 118 has an armature connected by linkage 120 to the power switch 122 having a movable contact connected with a suitable source of voltage such as battery 124. The fixed contact of the switch 122 is connected through conductor 126 to the signal device 128. The fixed contact of the switch 122 is also connected through conductor 126 and a manual switch 130 to the automatic pilot 132. The signal device 128 may suitably take the form of a signal lamp for providing a visual signal to the pilot on the combining glass 29 to indicate that a pull-up maneuver must be initiated. If desired, the automatic pilot may be utilized to initiate the pull-up maneuver when the minimum safe altitude has been reached.

In operation of the computer system, certain of the system parameters are preferably established in the pre-flight procedure in accordance with known values. The minimum acceleration A is determined by the pilot in accordance with the minimum value of acceleration he intends to pull after receiving the obstacle clearance warning signal. This is accomplished by adjustment of the control device 82 to set the potentiometer 78 to develop a signal voltage proportional to the reciprocal of the minimum value of acceleration. The minimum value of acceleration is selected because in the obstacle clearance computer it is necessary to predict a maximum safe radius of curvature to ensure clearance with a predetermined margin of safety. The target altitude $h_t$ is set in by adjustment of the control device 104. This setting introduces a known or estimated value of the altitude of the target above sea level. Also in the pre-flight procedure the minimum safe altitude $H_s$ is established by adjustment of the control device 96. This altitude is the lowest that can be tolerated safely at the bottom of the pull-up path, and its value will vary with the type of terrain, weather conditions, tactical restrictions, or other considerations.

Assuming that the aircraft is in flight and that the dive approach has been initiated, the air data computer 12 and the vertical gyro 16 operate to continuously develop signal voltages representative of the system variables. The air data computer develops an attack angle signal voltage which is applied to the sighthead 10 and accurate tracking of the target is executed by the pilot by maintaining the attitude of the aircraft so that the movable pipper 32 is aligned with the target. The attack angle signal voltage is also supplied to the radar system 28 for accurate tracking of the target by the radar antenna to permit continuous derivation of the slant range signal voltage $R_o$ corresponding to the distance from the aircraft to the target. The slant range signal voltage is supplied to the resolver rotor winding 66.

The attack angle signal voltage $\alpha$ is also supplied to the dive angle servo 14 and combined with the pitch angle $p$ from the vertical gyro 16 in the summing and servo amplifier 36. The servo motor 38 is energized from the amplifier 36 and is driven to a rotative position corresponding to the algebraic sum of the input signal voltages. The output shaft 40 of the dive angle servo is rotatively positioned in accordance with the instantaneous value of dive angle $\delta$ of the aircraft. Accordingly, the rotor winding 58 of the resolver 54 in the dive angle function generator 18 is positioned in accordance with dive angle. This rotor winding 58 is excited in accordance with the velocity signal voltage $V_a^2$ corresponding to the square of the aircraft velocity. Accordingly, the cosine function winding 62 of the resolver 54 develops a signal voltage which is proportional to the quantity $V_a^2 \cos \delta$. This output voltage of the resolver 54 is applied to the division potentiometer 76. Since the movable contact 80 is positioned in accordance with the reciprocal of the minimum value of acceleration the output signal voltage is proportional to the quantity $$\frac{V_a^2}{A}\cos \delta$$

which is applied to the summing amplifier 22.

The air data computer 12 supplies the velocity signal voltage $-V_a^2$ to the multiplication potentiometer 78. The movable contact 88 of the potentiometer is positioned in accordance with the reciprocal of the acceleration and derives a signal voltage proportional to the quantity $$-V_a^2/A$$

which is applied to the summing amplifier 22. The signal voltage derived from the air data computer 12 corresponding to the altitude above sea level $$+h_a$$

is applied through the normally closed switch 112 to the summing amplifier 22. Also the minimum safe altitude signal voltage $$-H_s$$

is applied to the summing amplifier 22. In a similar manner the pre-set value of target altitude $$-h_t$$

derived from potentiometer 100 is applied through the normally closed switch 108 to the summing amplifier 22.

The signal voltages are combined by the summing amplifier 22 in accordance with the expression $$(h_a - h_T) - H_s + \frac{V_a^2}{A}\cos \delta - \frac{V_a^2}{A} = e$$

This expression may be rewritten as $$H_a - H_s - \frac{V_a^2}{A}(1 - \cos \delta) = e$$

When the system variables represented by the terms of the above equation take on such values that $e=0$, the pull-up Equation 10 is satisfied $$H_a - H_s - \frac{V_a^2}{A}(1 - \cos \delta) = 0 \qquad (10)$$

Upon the occurrence of this zero summation the phase sensitive amplifier 24 develops a signal voltage output causing the relay 118 to be energized. This causes the power switch 122 to be closed against its fixed contact connecting the voltage source 124 with the signal device 128. Thus the pilot is furnished a warning signal denoting that the pull-up maneuver must be initiated in order to provide a safe margin of clearance. If the pilot had elected to provide automatic pull-up by closure of the switch 130, the warning signal voltage would also be applied to the automatic pilot 132. This warning signal voltage may be utilized with suitable programming equipment in the automatic pilot to initiate the pull-up maneuver.

In the event that operating conditions permit the use of radar equipment the altitude of the aircraft above the target may be derived directly for application to the summing amplfiier 22. When the switch 113 is actuated the contacts 74 are closed and the contacts 108 and 112 are opened. This is effective to interrupt the signal voltage conductors 110 and 106 and at the same time to complete the circuit from the resolver 56 to the summing amplifier 22 through contacts 74. The radar system 28 continuously provides an output signal voltage $R_o$ proportional to the slant range of aircraft to target. This signal voltage $R_o$ is applied to the rotor winding 66 of the resolver 56 and the rotor is continuously positioned in accordance with the dive angle by the dive angle servo shaft 40. Therefore, the fixed winding 70 of the resolver 56 develops a signal voltage proportional to the quantity $$H_a = R_o \sin \delta$$

which corresponds to the altitude of the aircraft above the target. Accordingly, a signal voltage corresponding to each term of the pull-up Equation 10 is supplied to the summing amplifier 22. The operation of the remainder of the system is the same as previously described and a warning signal is supplied the pilot or the automatic pilot upon the attainment of a solution to the above equation as signified by the predetermined summation in the summing amplifier 22.

A modification of the computer system for combining the system variables is shown in Figure 5. A summing amplifier 150 is provided having input conductors 110 and 106. The input conductor 106 is connected with the potentiometer 100 for deriving a signal voltage proportional to the altitude of the target $h_t$ above sea level. The conductor 110 is connected with the air data computer 12 which develops the signal voltage $h_a$ proportional to the altitude of the aircraft above sea level. The summing amplifier 150 algebraically combines these input signal voltages to develop an output voltage on conductor 152 which is proportional to the altitude $H_a$ of the aircraft above the target. The voltage $H_a$ is applied to the input of the summing amplifier 22.

A summing amplifier 154 is provided which receives input signal voltages on conductors 86 and 90. The conductor 86 is connected with the division potentiometer 76 which develops the signal voltage $$\frac{V_a^2}{A}\cos \delta$$

The conductor 90 is connected with the division potentiometer 78 which develops the signal voltage $$-\frac{V_a^2}{A}$$

The algebraic sum of the input signal voltages is developed by the summing amplifier 154 on the output conductor 156 which is connected to the input of the summing amplifier 22. This input voltage to the summing amplifier 22 is proportional to the predicted loss of altitude $$S = \frac{V_a^2}{A}(1-\cos\delta) \qquad (7)$$

to be incurred in a given pull-out maneuver. The signal voltage $H_s$ proportional to the minimum safe pull-out altitude which is pre-set in potentiometer 92 is applied by the conductor 98 to the summing amplifier 22. The summing amplifier 22 is effective to develop an output signal voltage on conductor 114 which is proportional to the algebraic sum of the input signal voltages. Since the input signal voltages represent the terms of the pull-out equation the output voltage of the summing amplifier 22 will become zero or null upon the satisfaction of the pull-out equation $$H_a - H_s - \frac{V_a^2}{A}(1-\cos\delta) = 0 \qquad (10)$$

The operation of the remainder of the system is identical to that previously described. The phase sensitive amplifier 24 causes the relay 118 to close the power switch 122 upon the occurrence of solution to the pull-up equation and the signal device 128 is energized to provide the clearance warning signal.

Although the description of this invention has been given with respect to a particular embodiment, it is not to be construed in a limiting sense. Many modifications and variations within the spirit and scope of the invention will now occur to those skilled in the art. For definition of the invention, reference is made to the appended claims.

We claim:

1. A pull-up computer for aircraft for predicting the impending loss of altitude in a pull-up maneuver comprising means responsive to aircraft velocity and a given pull-up acceleration value for developing a first signal quantity corresponding to the pull-up radius of curvature, means responsive to the first signal quantity and the aircraft dive angle for developing a second signal quantity corresponding to the vertical component of the distance of the aircraft from the center of the pull-up path at the existing dive angle of the aircraft, and means combining said signal quantities in opposition to derive a signal quantity corresponding to the impending loss of altitude.

2. A pull-up altitude computer for aircraft for predicting the impending loss of altitude in a pull-up maneuver comprising means for developing signal voltages corresponding to the square of aircraft velocity and the reciprocal of the value of acceleration to be incurred in the maneuver, a multiplication circuit receiving the velocity signal voltage and the acceleration signal voltage for developing a first signal voltage corresponding to the product thereof, means for developing a signal voltage corresponding to the product of the cosine function of the dive angle and the square of aircraft velocity, a multiplication circuit receiving the last mentioned signal voltage and the acceleration signal voltage for developing a second signal voltage corresponding to the product thereof, and a summing circuit combining said first and second signal voltages in opposition.

3. A computer for aircraft for developing a command signal to cause initiation of a corrective maneuver to ensure clearance of a flight path limit comprising means for developing signal quantities corresponding to the square of aircraft velocity, aircraft dive angle, and the reciprocal of the value of acceleration to be incurred in the maneuver, multiplying means combining the velocity signal quantity and the acceleration signal quantity to develop a first signal quantity corresponding to the product thereof, multiplying means combining the velocity signal quantity, the acceleration signal quantity, and the cosine function of the dive angle signal quantity to develop a second signal quantity corresponding to the product thereof, distance measuring means for developing a third signal quantity corresponding to the distance from the aircraft to said limit, summing means combining the second and third signal quantities in an additive sense and the first signal quantity in a subtractive sense, and null responsive means connected with the summing means for developing said command signal.

4. A computer for bomber aircraft for developing a command signal to cause initiation of a pull-up maneuver to ensure clearance of a flight path limit comprising means to enable tracking of a selected target in a collision course, means for developing a first signal quantity corresponding to the altitude of the aircraft above the target, means for developing a second signal quantity corresponding to a minimum safe altitude above the target, means responsive to aircraft velocity and a given pull-up acceleration value for developing a third signal quantity corresponding to the pull-up radius of curvature, means responsive to the third signal quantity and the aircraft dive angle for developing a fourth signal quantity corresponding to the vertical component of the distance of the aircraft from the center of the pull-up path at the existing dive angle of the aircraft, means combining the third and fourth signal quantities in opposition to derive a loss of altitude signal quantity, and means combining said first and second signal quantities with the loss of altitude signal quantity and developing a command signal when the sum of the minimum safe altitude signal quantity and the loss of altitude signal quantity is equal to or greater than the aircraft altitude signal quantity.

5. A computer for bomber aircraft for developing a command signal to cause initiation of a pull-up maneuver to ensure clearance of a flight path limit comprising means to enable tracking of a selected target in a dive approach course, means for developing a signal voltage corresponding to the altitude of the aircraft above the target, a potentiometer connected with a reference voltage source and having an adjustable element for developing a signal voltage corresponding to a minimum safe altitude on an output terminal thereof, a servo responsive to pitch and attack angles of the aircraft for positioning a shaft in accordance with the dive angle of the aircraft, a cosine resolver having a rotor connected with shaft, an air data computer developing a voltage proportional to the square of aircraft velocity on an output terminal thereof connected with excitation winding of the resolver, a potentiometer connected for excitation with the output winding of said resolver and having a movable element positioned in accordance with the reciprocal of acceleration to be incurred in the pull-up maneuver to develop a signal voltage on an output terminal thereof, a potentiometer connected for excitation with the velocity signal output terminal of the air data computer and having a movable element positioned in accordance with the reciprocal of said value of acceleration for developing a signal voltage on an output terminal thereof, a summing amplifier having input terminals connected with said means and the output terminal of each of said potentiometers for developing a voltage on the output terminal thereof corresponding to the algebraic sum of the signal voltages, a phase sensitive amplifier having an input terminal connected with the output terminal of the summing amplifier, and signaling means connected to the output terminal of the phase sensitive amplifier.

6. A computer for aircraft for developing a command signal to cause initiation of a pull-up maneuver to ensure clearance of a flight path limit comprising means for developing a signal voltage corresponding to the altitude of the aircraft above a minimum safe altitude, a servo responsive to pitch and attack angles of the aircraft for positioning a shaft in accordance with the dive angle of the aircraft, a cosine resolver having a rotor connected with said shaft, an air data computer developing a voltage proportional to the square of aircraft velocity on an output terminal connected with the excitation winding of said resolver, a first potentiometer connected for excitation with the output winding of said resolver, the movable contact of said potentiometer being positioned in accordance with the reciprocal of acceleration to be incurred in the pull-up maneuver to develop a signal voltage, a second potentiometer connected for excitation with the velocity signal output terminal of the air data computer and having a movable contact positioned in accordance with the reciprocal of said value of acceleration for developing a signal voltage, a summing amplifier having input terminals connected with said means and both of said movable contacts for developing a voltage on an output terminal thereof corresponding to the algebraic sum of the signal voltages, a phase sensitive amplifier having an input terminal connected with the output terminal of the summing amplifier, and signaling means connected to the output terminal of the phase sensitive amplifier.

References Cited in the file of this patent
UNITED STATES PATENTS 2,736,878    Boyle _____ Feb. 28, 1956